US009836432B2

(12) United States Patent
Ronagh

(10) Patent No.: US 9,836,432 B2
(45) Date of Patent: Dec. 5, 2017

(54) METHOD AND SYSTEM FOR SOLVING A CONVEX INTEGER QUADRATIC PROGRAMMING PROBLEM USING A BINARY OPTIMIZER

(71) Applicant: 1QB INFORMATION TECHNOLOGIES INC., Vancouver, BC (CA)

(72) Inventor: Pooya Ronagh, Vancouver (CA)

(73) Assignee: IQB INFORMATION TECHNOLOGIES INC., Vancouver (CA)

(*) Notice: Subject to any disclaimer, the term of this patent is extended or adjusted under 35 U.S.C. 154(b) by 215 days.

(21) Appl. No.: 14/509,783

(22) Filed: Oct. 8, 2014

(65) Prior Publication Data
US 2015/0106413 A1 Apr. 16, 2015

Related U.S. Application Data

(60) Provisional application No. 61/889,397, filed on Oct. 10, 2013.

(51) Int. Cl.
*G06F 17/11* (2006.01)
*G06N 99/00* (2010.01)
*B82Y 10/00* (2011.01)

(52) U.S. Cl.
CPC .............. *G06F 17/11* (2013.01); *B82Y 10/00* (2013.01); *G06N 99/002* (2013.01)

(58) Field of Classification Search
CPC .................................................. G06N 99/002
See application file for complete search history.

(56) References Cited

U.S. PATENT DOCUMENTS

| | | | | |
|---|---|---|---|---|
| 2008/0065573 A1* | 3/2008 | Macready | ............... | G06N 7/08 706/19 |
| 2008/0109500 A1* | 5/2008 | Macready | ............. | B82Y 10/00 708/2 |
| 2009/0121215 A1* | 5/2009 | Choi | ..................... | B82Y 10/00 257/31 |
| 2011/0047201 A1* | 2/2011 | Macready | ............. | B82Y 10/00 708/446 |
| 2012/0023053 A1* | 1/2012 | Harris | ................... | B82Y 10/00 706/45 |

(Continued)

OTHER PUBLICATIONS

McGeoch, Catherine C. and Cong Wang. (2013), "Experimental Evaluation of an Adiabatic Quantum System for Combinatorial Optimization," Computing Frontiers, May 14-16, 2013. <http://www.cs.amherst.edu/ccm/cf14-mcgeoch.pdf>.

*Primary Examiner* — Matthew Sandifer
(74) *Attorney, Agent, or Firm* — Pearl Cohen Zedek Latzer Baratz LLP

(57) ABSTRACT

A method and system are disclosed for solving a convex integer quadratic programming problem using a binary optimizer, the method comprising use of a processor for receiving a convex integer quadratic programming problem; converting the convex integer quadratic programming problem into a plurality of constrained and unconstrained binary quadratic programming problems and providing the plurality of unconstrained binary quadratic programming problems to the binary optimizer to thereby solve the convex integer quadratic programming problem.

14 Claims, 10 Drawing Sheets

(56) References Cited

U.S. PATENT DOCUMENTS

| | | | |
|---|---|---|---|
| 2014/0187427 A1* | 7/2014 | Macready | G06N 99/002 505/170 |
| 2014/0297247 A1* | 10/2014 | Troyer | G06F 17/5009 703/21 |
| 2014/0324933 A1* | 10/2014 | Macready | G06F 17/10 708/200 |

* cited by examiner

METHOD AND SYSTEM FOR SOLVING A CONVEX INTEGER QUADRATIC PROGRAMMING PROBLEM USING A BINARY OPTIMIZER

CROSS-REFERENCE TO RELATED APPLICATIONS

This application claims priority of U.S. Patent Application No. 61/889,397, entitled "Method and system for solving an integer optimization problem using an analog computer," that was filed on Oct. 10, 2013, the specification of which is hereby incorporated by reference.

FIELD OF THE INVENTION

The invention relates to convex integer programming. More precisely, the invention pertains to a method and system for solving a convex integer quadratic programming problem using a binary optimizer.

BACKGROUND OF THE INVENTION

Quantum annealing is of great interest for solving optimization problems.

There exist state of the art prototypes of systems that perform quantum annealing.

That being said, an issue can be the translation of the optimization problem to be solved into one that can be readily solved using quantum annealing.

The translation can be cumbersome to achieve since quantum annealing can be readily used only to solve a limited type of optimization problems.

Specifically, quantum annealing is currently being used to solve binary quadratic programming problems.

There is therefore a need for a method for solving optimization problems that will overcome at least one of the above-identified drawbacks.

Features of the invention will be apparent from review of the disclosure, drawings and description of the invention below.

BRIEF SUMMARY

According to one aspect of the invention, there is disclosed a method for solving a convex integer quadratic programming problem using a binary optimizer, the method comprising use of a processor for receiving a convex integer quadratic programming problem; converting the convex integer quadratic programming problem into a plurality of constrained and unconstrained binary quadratic programming problems; and providing the plurality of unconstrained binary quadratic programming problems to the binary optimizer to thereby solve the convex integer quadratic programming problem.

In accordance with one embodiment of the method, the receiving of a convex integer quadratic programming problem using the processor comprises obtaining a quadratic objective function representative of the convex integer quadratic programming problem; obtaining equality constraints; obtaining inequality constraints; modifying the quadratic objective function and providing the modified quadratic objective function with only inequality constraints.

In accordance with another embodiment of the method, the modifying of the quadratic objective function comprises adding the equality constraints to the quadratic objective function as penalty terms.

In accordance with another embodiment of the method, the converting of the convex integer quadratic programming problem into a plurality of constrained and unconstrained binary quadratic programming problems using the processor comprises identifying a first plurality of fundamental cubes contained in a polytope and a second plurality of fundamental cubes intersecting the boundary and exterior of the polytope; determining a corresponding binary programming problem for each of the first plurality of fundamental cubes contained in the polytope and determining a corresponding constrained binary programming problem for each of the second plurality of fundamental cubes intersecting the boundary and exterior of the polytope and the plurality of unconstrained binary quadratic programming problems comprises the plurality of binary programming problem for each of the first plurality of fundamental cubes.

In accordance with another embodiment of the method, the determining of a corresponding constrained binary programming problem for each of the second plurality of fundamental cubes intersecting the boundary and exterior of the polytope further comprises adding a system of inequality constraints.

In accordance with yet another embodiment of the method, the determining of a corresponding binary programming problem of a given fundamental cube comprises computing a pullback of the modified quadratic objective function along the given fundamental cube.

In accordance with another aspect of the invention, there is disclosed a method for solving a convex integer quadratic programming problem using a binary optimizer, the method comprising receiving, using a processor, a convex integer quadratic programming problem; converting, using the processor, the convex integer quadratic programming problem into a plurality of constrained and unconstrained binary quadratic programming problems; providing, using the processor, the plurality of unconstrained binary quadratic programming problems to the binary optimizer; obtaining from the binary optimizer, using the processor, a plurality of solutions for the plurality of unconstrained binary quadratic programming problems to the binary optimizer and determining, using the processor, a solution using at least the plurality of solutions.

In accordance with an embodiment of the method, the receiving of a convex integer quadratic programming problem using the processor comprises obtaining a quadratic objective function representative of the convex integer quadratic programming problem; obtaining equality constraints; obtaining inequality constraints; modifying the quadratic objective function and providing the modified quadratic objective function with only inequality constraints.

In accordance with one embodiment of the method, the modifying of the quadratic objective function comprises adding the equality constraints to the quadratic objective function as penalty terms.

In accordance with another embodiment of the method, the converting of the convex integer quadratic programming problem into a plurality of unconstrained binary quadratic programming problems using the processor comprises identifying a first plurality of fundamental cubes contained in a polytope and a second plurality of fundamental cubes intersecting the boundary and exterior of the polytope; determining a corresponding unconstrained binary programming problem for each of the first plurality of fundamental cubes contained in the polytope and a constrained binary programming problem for each of the second plurality of fundamental cubes intersecting the boundary and exterior of the polytope; and the plurality of unconstrained binary quadratic programming problems comprises the plurality of binary programming problem for each of the first plurality of fundamental cubes.

In accordance with an embodiment of the method, the determining of a corresponding constrained binary programming problem for each of the second plurality of fundamental cubes intersecting the boundary and exterior of the polytope further comprises adding a system of inequality constraints.

In accordance with another embodiment of the method, the determining of a corresponding binary programming problem of a given fundamental cube comprises computing a pullback of the modified quadratic objective function along the given fundamental cube.

In accordance with an embodiment of the method, the determining using the processor of a solution using at least the plurality of solutions comprises solving the plurality of constrained binary problems to provide a corresponding set of solutions; and determining a minimum in the corresponding set of solutions and the plurality of solutions.

In accordance with another aspect of the invention, there is disclosed a system for solving a convex integer quadratic programming problem, the system comprising a binary optimizer for receiving a plurality of unconstrained binary quadratic programming problems, solving the plurality of unconstrained binary quadratic programming problems and providing a plurality of corresponding solutions and a digital computer for receiving a convex integer quadratic programming problem, determining the plurality of constrained and unconstrained binary quadratic problems, providing the plurality of unconstrained binary quadratic problems to the binary optimizer, obtaining from the binary optimizer the plurality of solutions, determining a solution using the plurality of solution and providing the determined solution.

In accordance with another embodiment of the system, the convex integer quadratic programming problem is provided to the digital computer by one of a user, an independent software package and an intelligent agent.

In accordance with another embodiment of the system, the determined solution is provided to one of a user interacting with the digital computer and another computer operatively connected to the digital computer.

In accordance with another aspect of the invention, there is disclosed a non-transitory computer-readable storage medium storing computer-executable instructions which, when executed, cause a digital computer to perform a method for solving a convex integer quadratic programming problem using a binary optimizer, the method comprising receiving, using a processor, a convex integer quadratic programming problem; converting, using the processor, the convex integer quadratic programming problem into a plurality of constrained and unconstrained binary quadratic programming problems; providing, using the processor, the plurality of unconstrained binary quadratic programming problems to the binary optimizer; obtaining from the binary optimizer, using the processor, a plurality of solutions for the plurality of unconstrained binary quadratic programming problems to the binary optimizer and determining, using the processor, a solution using at least the plurality of solutions.

In accordance with another aspect of the invention, there is disclosed a digital computer for solving a convex integer quadratic programming problem, the digital computer comprising a display device; a processor; a communication port; a memory unit comprising an application and one or more programs, wherein the one or more programs are stored in the memory and configured to be executed by the one or more central processing units, the one or more programs including: instructions for receiving a convex integer quadratic programming problem; instructions for converting the convex integer quadratic programming problem into a plurality of constrained and unconstrained binary quadratic programming problems; instructions for providing the plurality of unconstrained binary quadratic programming problems to the binary optimizer; instructions for obtaining from the binary optimizer a plurality of solutions for the plurality of unconstrained binary quadratic programming problems to the binary optimizer; instructions for determining a solution using at least the plurality of solutions; and instructions for providing the solution.

An advantage of the method disclosed herein is that it enables the translation of an integer quadratic programming problem into a plurality of binary programming problems that can be solved by a binary optimizer.

The invention disclosed herein therefore provides a method that greatly improves the processing of a system for solving a complex integer quadratic programming problem.

The processing of the system for solving a complex integer quadratic programming problem is greatly improved by using a binary optimizer.

BRIEF DESCRIPTION OF THE DRAWINGS

In order that the invention may be readily understood, embodiments of the invention are illustrated by way of example in the accompanying drawings.

Figure 1:
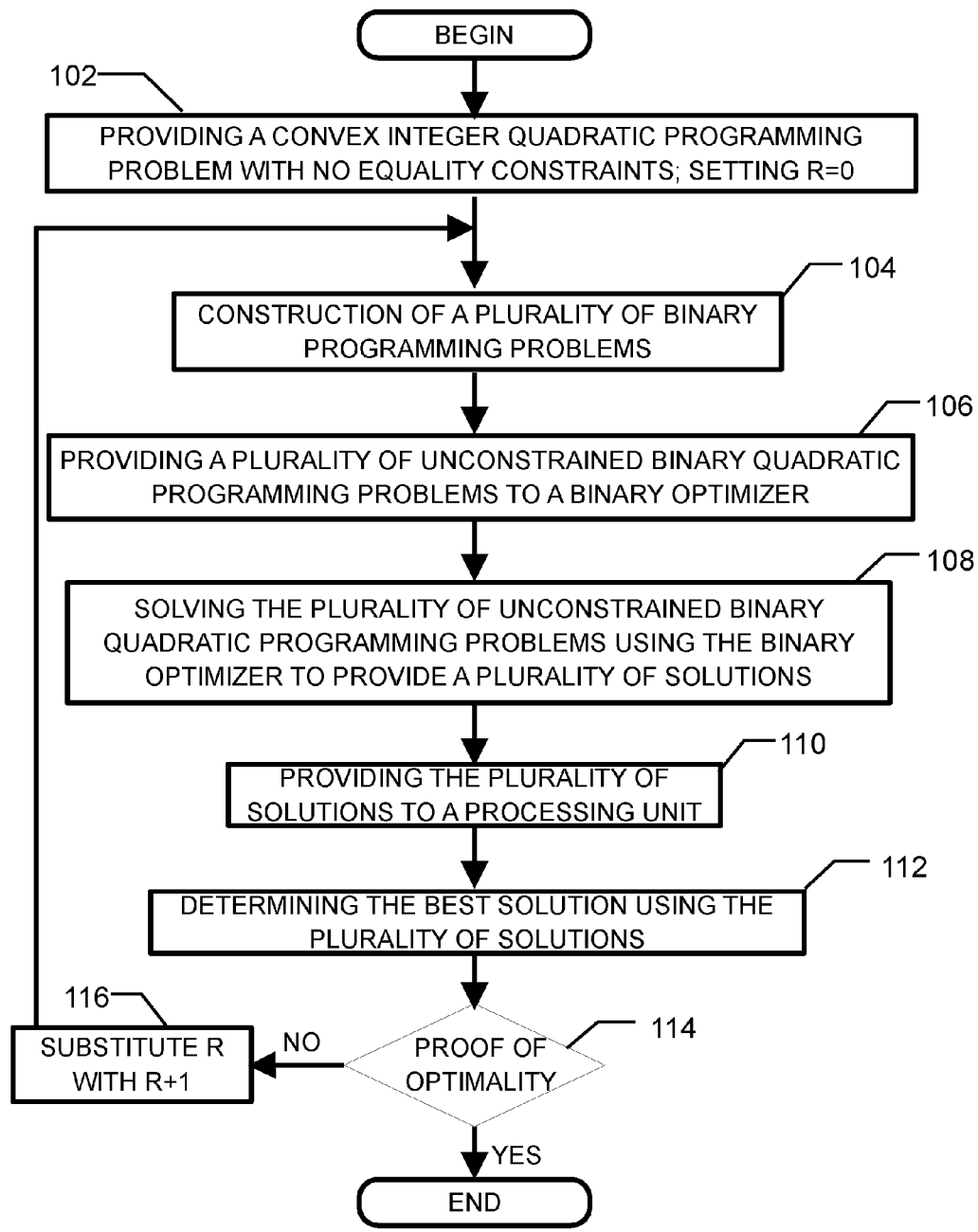
FIG. 1 is a flowchart that shows an embodiment of a method for solving a convex integer quadratic programming problem using a binary optimizer.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

Terms

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The term "e.g." and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

The term "convex integer quadratic programming problem" and like terms mean finding a minimum of a convex quadratic real polynomial $y=f(x)$ in several integer variables $x=(x_1, \ldots, x_n)$ subject to a (possibly empty) family of linear equality constraints determined by a linear system $A_{eq}x=b_{eq}$ where $A_{eq}$ is a matrix of size m×n and $b_{eq}$ is a column matrix of size m×1 and a (possibly empty) family of inequality constraints determined by $A_{ineq}x \leq b_{ineq}$ where $A_{ineq}$ is a matrix of size p×n and $b_{ineq}$ is a column matrix of size p×1.

It is appreciated that for the objective function $y=f(x)$ to be convex, we require that when we present it in matrix notation $y=f(x)=x^tAx+B^tx+C$ the matrix A symmetric positive semi-definite square matrix of size n.

The term "unconstrained binary quadratic programming" and like terms mean finding a minimum of an objective function $y=x^tQx$ where Q is a symmetric square real matrix of size n and the matrix of variables ranges over all vectors $x \in B^n = \{0,1\}^n$ with binary entries.

The term "binary optimizer" and like terms mean a system consisting of one or many types of hardware that can find optimal or sub-optimal solutions to an unconstrained binary quadratic programming problem. An example of which is a system consisting of a digital computer embedding a binary quadratic programming problem as an Ising spin model, attached to an analog computer that carries optimization of a configuration of spins in an Ising spin model. An embodiment of such analog computer is disclosed by McGeoch, Catherine C. and Cong Wang. (2013). "Experimental Evaluation of an Adiabatic Quantum System for Combinatorial Optimization" Computing Frontiers. May 14-16, 2013 (http://www.cs.amherst.edu/ccm/cf14-mcgeoch.pdf). It will be appreciated that the "binary optimizer" may also be comprised of "classical components", such as a classical computer. Accordingly, the "binary optimizer" may be entirely analog or an analog-classical hybrid.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that the invention may be implemented in numerous ways, including as a method, a system, a computer readable medium such as a computer readable storage medium. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task.

With all this in mind, the present invention is directed to a method, system, and computer program product for solving a convex integer quadratic programming problem.

Figure 2:
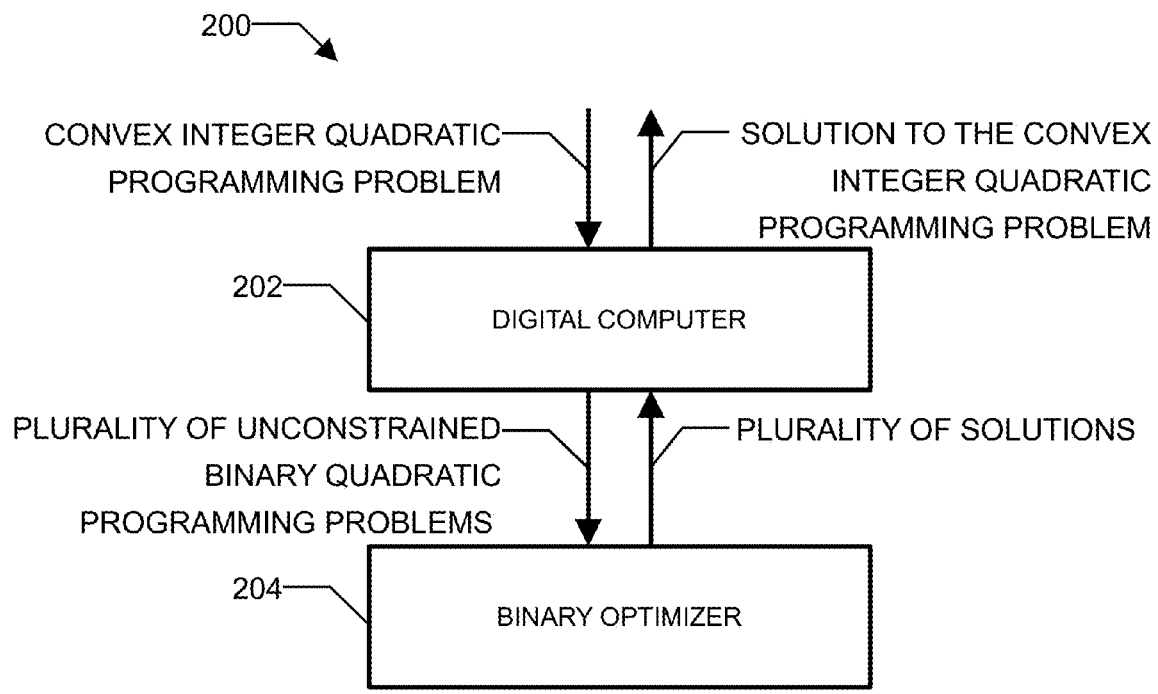
FIG. 2 is a diagram of an embodiment of a system in which the method for solving a convex integer quadratic programming problem using a binary optimizer may be implemented. The system comprises a digital computer and a binary optimizer.

Now referring to FIG. 2, there is shown an embodiment of a system 200 in which an embodiment of the method for solving a convex integer quadratic programming problem using a binary optimizer may be implemented.

The system 200 comprises a digital computer 202 and a binary optimizer 204.

The digital computer 202 receives a convex integer quadratic programming problem and provides a solution to the convex integer quadratic programming problem.

It will be appreciated that the convex integer quadratic programming problem may be provided according to various embodiments.

In one embodiment, the convex integer quadratic programming problem may be provided by a user interacting with the digital computer 202.

Alternatively, the convex integer quadratic programming problem may be provided by another computer operatively connected to the digital computer 202. Alternatively, the convex integer quadratic programming problem may be provided by an independent software package. Alternatively, the convex integer quadratic programming problem may be provided an intelligent agent.

Similarly, it will be appreciated that the solution to the convex integer quadratic programming problem may be provided according to various embodiments.

In accordance with an embodiment, the solution to the convex integer quadratic programming problem may be provided to the user interacting with the digital computer 202.

Alternatively, the solution to the convex integer quadratic programming problem may be provided to another computer operatively connected to the digital computer 202.

In fact, it will be appreciated by the skilled addressee that the digital computer 202 may be any type of computer.

In one embodiment, the digital computer 202 is selected from a group consisting of desktop computers, laptop computers, tablet PC's, servers, smartphones, etc.

Figure 3:
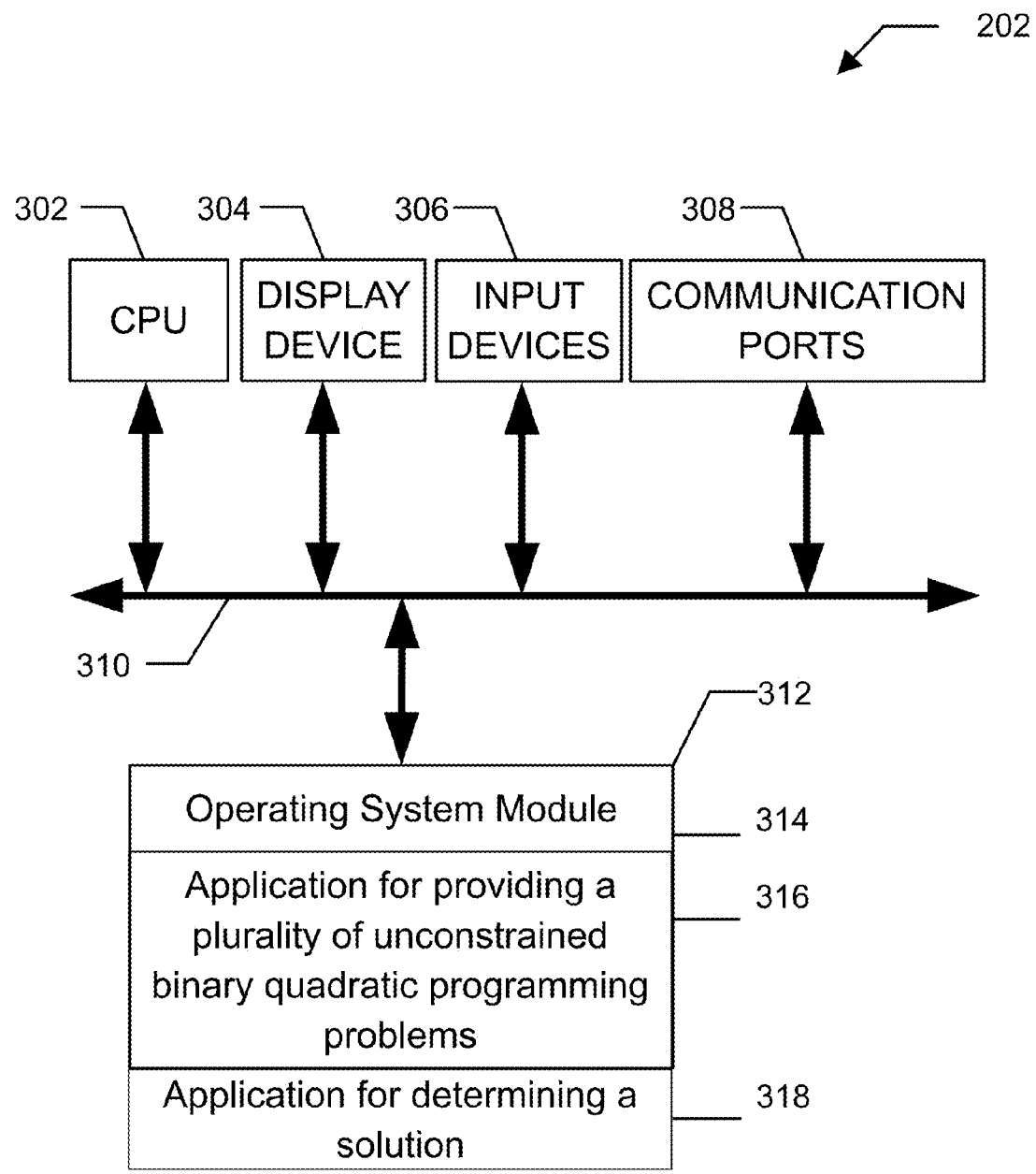
FIG. 3 is a diagram that shows an embodiment of a digital computer used in the system for solving a convex integer quadratic programming problem using a binary optimizer.

Now referring to FIG. 3, there is shown an embodiment of a digital computer 202. It will be appreciated that the digital computer 202 may be also be broadly referred to as a processor.

In this embodiment, the digital computer 202 comprises a central processing unit (CPU) 302, also referred to as a microprocessor, a display device 304, input devices 306, communication ports 308, a data bus 310 and a memory unit 312.

The CPU 302 is used for processing computer instructions. The skilled addressee will appreciate that various embodiments of the CPU 302 may be provided.

In one embodiment, the CPU 302 is a CPU Core i7-3820 running at 3.6 GHz and manufactured by Intel™.

The display device 304 is used for displaying data to a user. The skilled addressee will appreciate that various types of display device 304 may be used.

In one embodiment, the display device 304 is a standard liquid-crystal display (LCD) monitor.

The communication ports 308 are used for sharing data with the digital computer 202.

The communication ports 308 may comprise for instance a universal serial bus (USB) port for connecting a keyboard and a mouse to the digital computer 202.

The communication ports 308 may further comprise a data network communication port such as an IEEE 802.3 (Ethernet) port for enabling a connection of the digital computer 202 with another computer via a data network.

The skilled addressee will appreciate that various alternative embodiments of the communication ports 308 may be provided.

In one embodiment, the communication ports 308 comprise an Ethernet port and a mouse port (e.g. Logitech™).

The memory unit 312 is used for storing computer executable instructions.

It will be appreciated that the memory unit 312 comprises, in one embodiment, an operating system module 314.

It will be appreciated by the skilled addressee that the operating system module 314 may be of various type.

In an embodiment, the operating system module 314 is Windows™ 8 manufactured by Microsoft™.

The memory unit 312 further comprises an application for providing a plurality of unconstrained binary quadratic programming problems 316.

The memory unit 312 further comprises an application for determining a solution 318.

Each of the CPU 302, the display device 304, the input devices 306, the communication ports 308 and the memory unit 312 is interconnected via the data bus 310.

It will be appreciated that in another embodiment, the memory unit 312 comprises one or more programs, the one or more programs configured to be executed by the CPU 302, the one or more programs including instructions for receiving a convex integer quadratic programming problem; instructions for converting the convex integer quadratic programming problem into a plurality of constrained and unconstrained binary quadratic programming problems; instructions for providing the plurality of unconstrained binary quadratic programming problems to the binary optimizer; instructions for obtaining from the binary optimizer a plurality of solutions for the plurality of unconstrained binary quadratic programming problems to the binary optimizer; instructions for determining a solution using at least the plurality of solutions and instructions for providing the solution.

Now referring back to FIG. 2, it will be appreciated that the binary optimizer 204 is operatively connected to the digital computer 202.

It will be appreciated that the coupling of the binary optimizer 204 to the digital computer 202 may be achieved according to various embodiments.

In one embodiment, the coupling of the binary optimizer 204 to the digital computer 202 is achieved via a data network.

The binary optimizer 204 may be of various types.

In one embodiment, the binary optimizer 204 is manufactured by D-Wave Systems Inc. More information on this embodiment of a binary optimizer applicable to 204 can be found at http://www.dwavesys.com. The skilled addressee will appreciate that various alternative embodiments may be provided for the binary optimizer 204.

More precisely, the binary optimizer 204 receives a plurality of unconstrained binary quadratic programming problems from the digital computer 202.

The binary optimizer 204 is capable of solving the plurality of unconstrained binary quadratic programming problems and of providing a plurality of corresponding solutions.

The plurality of solutions is provided by the binary optimizer 204 to the digital computer 202.

Now referring to FIG. 1 and according to processing step 102, a convex integer quadratic programming problem is provided and the equality constraints of it are eliminated.

The inputs are matrices A, B and C representative of a quadratic objective function, $A_{eq}, b_{eq}$ representative of equality constraints, and $A_{ineq}, b_{ineq}$ representative of the inequality constraints. It will be appreciated that the providing of a convex integer quadratic programming problem is achieved using a processor in one embodiment.

An embodiment of quadratic polynomial representative of a convex integer quadratic programming problem may be represented by $x^T A x + B^T x + C$, a quadratic polynomial having n integer variables.

For instance, the function $f(x_1, x_2) = x_1^2 + x_2^2 - x_1 x_2 + x_1 + x_2$ could be provided. And the goal is minimization of this function over integers satisfying a set of equality and inequality constraints that will be introduced later.

It will be appreciated that aside the real polynomial representative of convex integer quadratic programming problems various inputs are provided.

More precisely, a system of linear equality constraints is provided.

In the case of the example disclosed above, the system of linear equality constraints could be for instance: $2x_1+3x_2=6$.

It will be appreciated that a system of linear inequality constraints is also provided.

It will be appreciated that this system of linear equality constraints may also be represented as:

$$(2\ 3)\begin{pmatrix}x_1\\x_2\end{pmatrix}=6,$$

in other words using matrices $A_{eq}=(2\ 3)$ and $b_{ineq}=(6)$.

It will be appreciated that a system of linear inequality constraints is also provided.

In the example disclosed above, the linear inequalities are:

$$x_1+x_2 \leq \frac{13}{3}$$

and $x_1+x_2 \geq 1$.

This system of linear inequalities may also contain box constraints, which provide upper and lower bounds for the variables.

In this example, the box constraints are: $x_1 \geq 0$ and $x_2 \geq 0$.

It will be appreciated that this system of linear inequality constraints may also be represented as:

$$\begin{pmatrix}1 & 1\\-1 & -1\\-1 & 0\\0 & -1\end{pmatrix}\begin{pmatrix}x_1\\x_2\end{pmatrix}\leq\begin{pmatrix}4.33\\1\\0\\0\end{pmatrix},$$

and in other words using the matrices $$A_{ineq}=\begin{pmatrix}1 & 1\\-1 & -1\\-1 & 0\\0 & -1\end{pmatrix}$$

and $$b_{ineq}=\begin{pmatrix}4.33\\1\\0\\0\end{pmatrix}.$$

Figure 4:
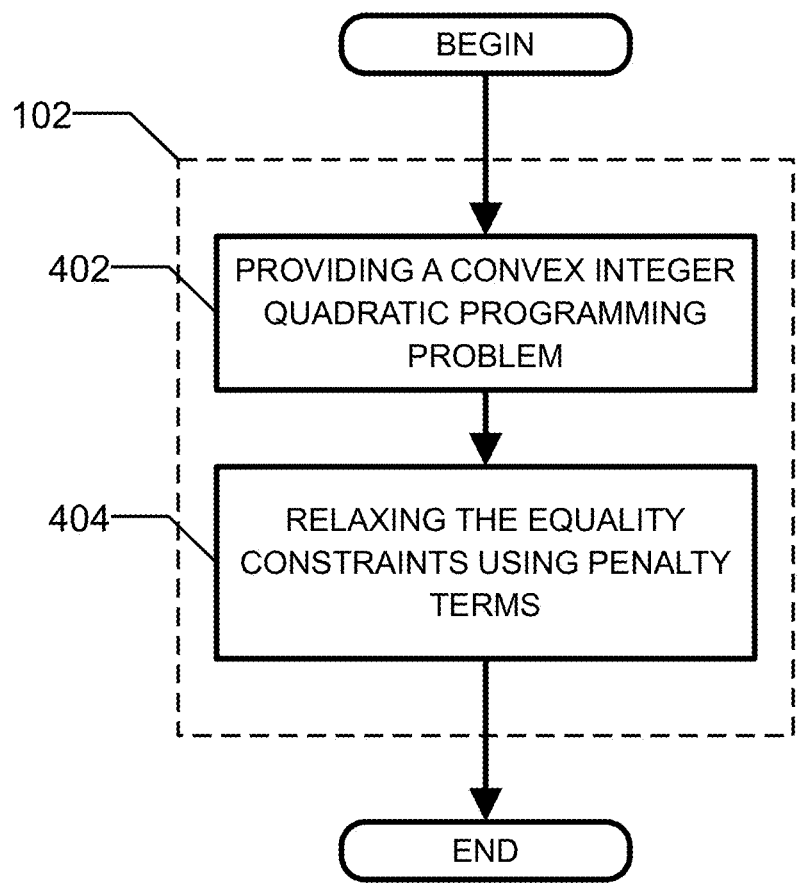
FIG. 4 is a flowchart that shows an embodiment for providing a convex integer quadratic programming problem.

Now referring to FIG. 4, there is shown an embodiment for eliminating the equality constraints and providing a convex integer quadratic programming problem with no equality constraints (and only inequality constraints).

According to processing step 402, a convex integer quadratic programming problem is provided.

According to processing step 404, the objective function $y=f(x)$ is modified to another quadratic function, $p(x)=f(x)+M(A_{eq}x-b_{eq})^2$, in which the equality constraints of the convex integer quadratic programming problem are added as penalty terms to the original objective function. The coefficient M is a real number chosen in such a way that the value of $y=p(x)$ at all points x satisfying the linear equalities, is smaller than the value of $y=p(x)$ at points the linear equalities are not satisfied: $(x)\leq p(x')$ for all points x, $x'\in B''$ such that $A_{eq}x=b_{eq}$ and $A_{eq}x'\neq b_{eq}$.

In the embodiment disclosed above, $p(x)=f(x)+50(2x_1+3x_2-6)^2$.

Now referring back to FIG. 1 and still according to processing step 102, a loop counter denoted by R is initialized with value zero R=0.

Now referring back to FIG. 1 and according to processing step 104, the integer programming problem is converted into a plurality of binary programming problems. It will be appreciated that the conversion of the polynomial into a plurality of constrained or unconstrained binary quadratic programming problems is achieved using a processor in one embodiment.

Figure 5:
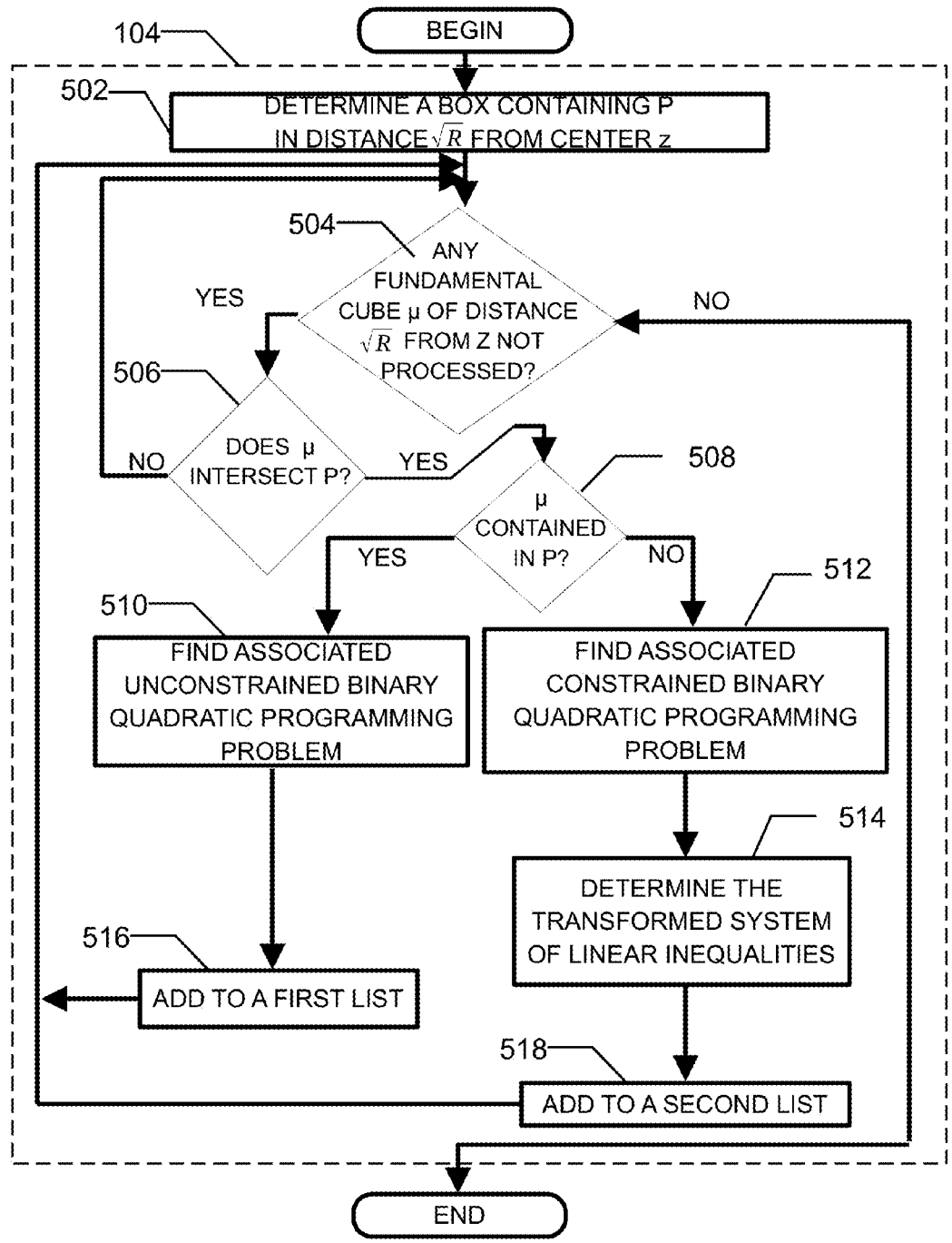
FIG. 5 is a flowchart that shows an embodiment for converting the convex integer quadratic programming problem into a plurality of unconstrained binary quadratic problems.

Now referring to FIG. 5, there is shown an embodiment for performing such processing step.

If $B''=\{0,1\}''$ is the set of all binary vectors in $\mathbb{Z}''$, an affine transformation, $\mu_c:B''\rightarrow\mathbb{Z}''$ given by $x\mapsto x+c$ is defined as a fundamental cube. Here $c\in\mathbb{Z}''$ is a vector of integers.

Figure 7:
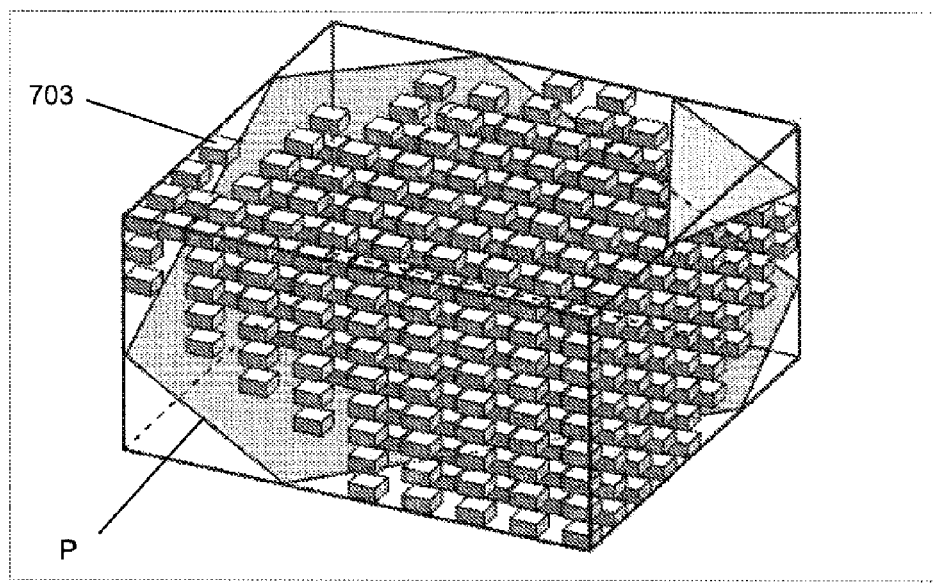
FIG. 7 is a schematic illustrating an example showing tiling feasible lattice points with higher dimensional fundamental cubes. In this figure, the domain of the minimization problem is the intersection of the circumscribing box given by box constraints and half planes cut out by linear inequality constraints.

Now referring to FIG. 7, there is shown an illustration of a polytope P and a plurality of fundamental cubes, such as fundamental cube 703.

It will be appreciated that the fundamental cubes of interest are the ones that have nonempty intersection with a polytope P.

Figure 8:
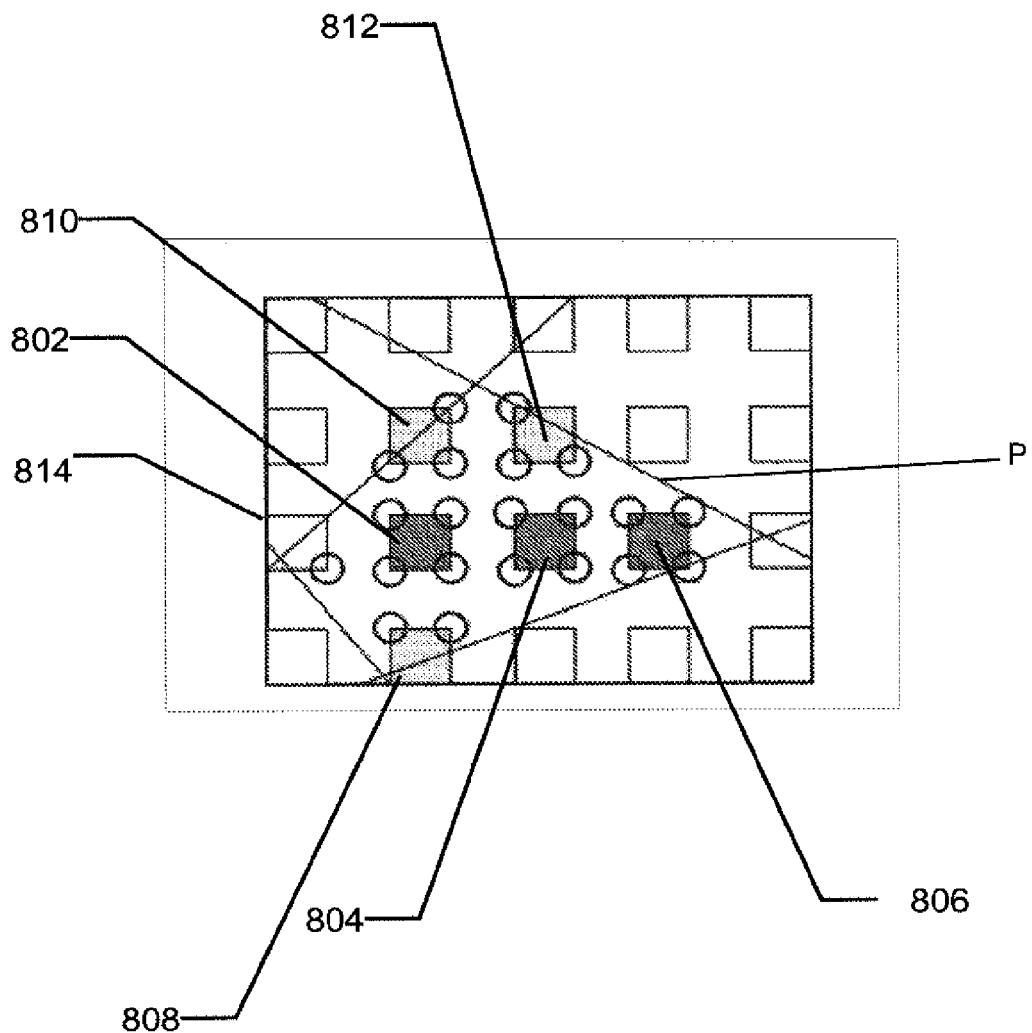
FIG. 8 is a diagram that shows an embodiment illustrating placement of fundamental cubes with respect to the polytope.

Now referring to FIG. 8, there is illustrated an example that shows various cases for the fundamental cubes.

For instance, in this case, fundamental cube 802, fundamental cube 804 and fundamental cube 806 are entirely contained in the polytope P.

Still in this embodiment, fundamental cube 808, fundamental cube 810 and fundamental cube 812 intersect the boundary of polytope P on one facet and fundamental cube 814 intersects the boundary of polytope in more than one facet.

Figure 9:
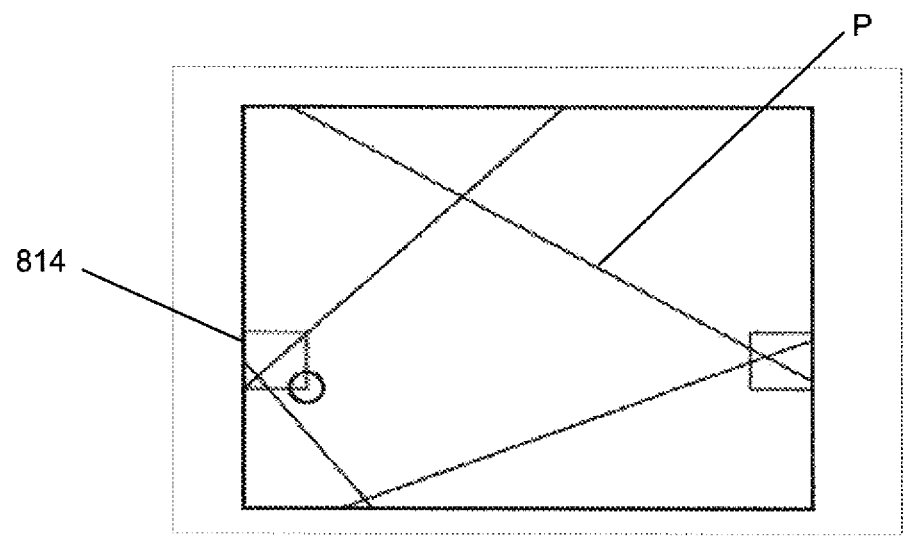
FIG. 9 is a diagram that illustrates fundamental cubes that intersect lower dimensional faces of the polytope.

Now referring to FIG. 9, there are shown two fundamental cubes corresponding to the example discloses above. In this example, fundamental cube 814 intersects the boundary of the polytope P in more than one facet.

Figure 10:
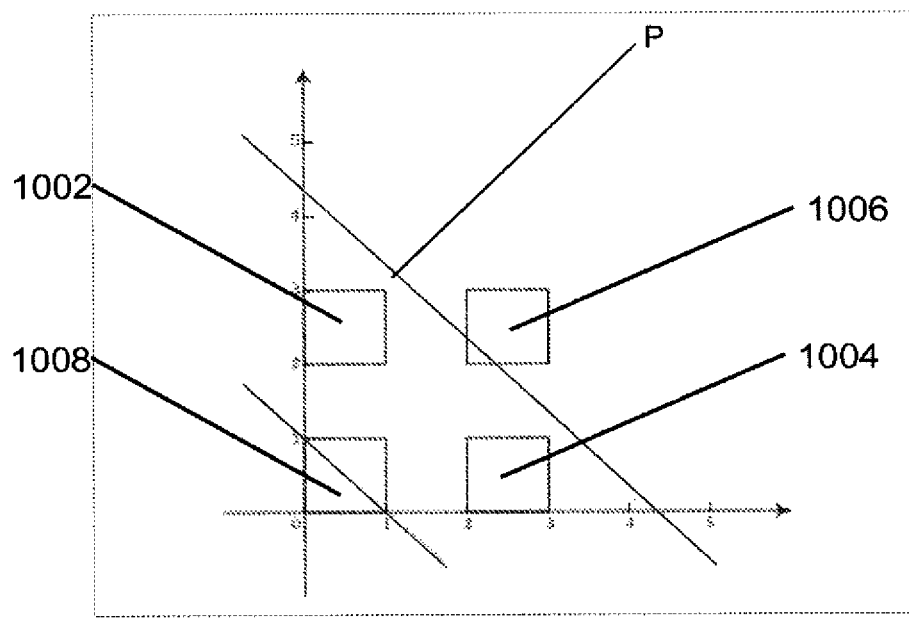
FIG. 10 is a diagram that shows an induced visible region for an embodiment depicting four cubes that are completely contained in the polytope or intersect the boundary and exterior of the polytope.

Now referring to FIG. 10, there is shown a plurality of fundamental cubes corresponding to the example disclosed above.

In this example, fundamental cube 1002 and fundamental cube 1004 are entirely contained in the polytope P while fundamental cube 1006 and 1008 are partially contained in the polytope P.

Now referring back to FIG. 5 and according to processing step 502, a box containing the polytope P is determined. The box is determined using the system of linear constraints. A box is the same as a set of upper and lower bounds on the integer variables, hence a set of inequality conditions $l_i \leq x_i \leq u_i$ for i=1, . . . , n.

Also a reference point $z\in\mathbb{Z}''$ is computed. This is the minimum of the objective function viewed as a function of real variables, which then is rounded to the nearest integer point.

In the example disclosed here, this point is (−1, −1).

According to processing step 504, a test is performed to find out if the optimal solution of the integer programming problem has already been found and, if not, is any fundamental cube $\mu$ of distance $\sqrt{R}$ from z is not processed.

In the case where a fundamental cube μ is not processed and according to processing step 506, a test is performed to find out if the fundamental cube μ is intersecting the polytope P.

In the case where the fundamental cube μ is intersecting the polytope P and according to processing step 508, a test is performed in order to find out if the fundamental cube μ is contained in the polytope P.

In the embodiment shown in FIG. 8, a fundamental cube μ is contained in P would be for instance one of fundamental cubes 802, 804 and fundamental cube 806.

In the case where the fundamental cube μ is contained within the polytope P and in accordance with processing step 510, associated unconstrained binary programming problems are determined.

In fact, it will be appreciated that for a fundamental cube $\mu_c$ the unconstrained binary programming problem is the pullback of the polynomial p(x) along μ_c written as p∘$\mu_c$(x)=p(x+c).

According to processing step 516, the associated unconstrained binary programming problems are added to a first list.

In the case of the example disclosed above, the following associated unconstrained binary programming problems are added to the first list when R=10:

Minimization of $p_{(0,2)}(x_1,x_2)=f(x_1,x_2)+50(2x_1+3x_2)^2-2x_1+4x_2+6$ on binary variables $x_1$ and $x_2$; and Minimization of $p_{(2,0)}(x_1,x_2)=f(x_1,x_2)+50(2x_1+3x_2-2)^2-2x_2+4x_1+6$ on binary variables $x_1$ and $x_2$.

The associated real polynomials in binary variables correspond to fundamental cube 1002 and fundamental cube 1004 both of distance $\sqrt{10}$ from reference point.

In the case where the fundamental cube μ is not contained in the polytope P and in accordance with processing step 512, these fundamental cubes are processed as constrained binary optimization problems. First the associated objective functions are determined. These are again the associated pullback polynomials p∘$\mu_c$(x)=p(x+c).

In the embodiment shown in FIG. 8, a fundamental cube μ intersects only one facet of P would one of fundamental cube 808, fundamental cube 810 and fundamental cube 812.

According to processing step 514, a system of inequality constraints represented by $A_{ineq}x \leq b_{ineq} - A_{ineq}c$ is added to the determined associated constrained binary optimization problem.

According to processing step 518, the associated constrained binary optimization problems are added to a second list.

In the example disclosed above, the following associated constrained binary optimization problem is added to the second list when R=2:

Minimization of $p_{(0,0)}(x_1,x_2)=f(x_1,x_2)+50(2x_1+3x_2-6)^2$ on binary variables $x_1$ and $x_2$ subject to the following inequality constraints $$\begin{pmatrix} 1 & 1 \\ -1 & -1 \\ -1 & 0 \\ 0 & -1 \end{pmatrix} \begin{pmatrix} x_1 \\ x_2 \end{pmatrix} \leq \begin{pmatrix} 4.33 \\ 1 \\ 0 \\ 0 \end{pmatrix},$$

and the following constrained binary optimization problem is added to the second list when R=18:

Minimization of $p_{(2,2)}(x_1,x_2)=f(x_1,x_2)+50(2x_1+3x_2+4)^2+^2x_1+2x_2+8$ subject to the following inequality constraints:

$$\begin{pmatrix} 1 & 1 \\ -1 & -1 \\ -1 & 0 \\ 0 & -1 \end{pmatrix} \begin{pmatrix} x_1 \\ x_2 \end{pmatrix} \leq \begin{pmatrix} 0.33 \\ 5 \\ 2 \\ 2 \end{pmatrix}.$$

The associated constrained binary quadratic optimization problems correspond to fundamental cube 1006 of distance $\sqrt{2}$ from reference point and fundamental cube 1008 of distance $\sqrt{18}$ from reference point.

Now referring back to FIG. 1 and according to processing step 106, the plurality of unconstrained binary optimization quadratic programming problems from the first list are provided to the binary optimizer. It will be appreciated that the providing of the unconstrained binary optimization problems to binary optimizer is achieved using a processor in one embodiment.

More precisely, it will be appreciated that in one embodiment, a token system is used over the Internet to provide access to the binary optimizer remotely and authenticate use.

According to processing step 108, the plurality of unconstrained binary optimization problems corresponding to the first list are solved using the binary optimizer to provide a plurality of solutions.

It will be appreciated that the plurality of solutions is provided in a table by the binary optimizer.

In the example disclosed above, the binary optimizer provides the binary point (1, 0) for $\min\{p_{(2,0)}(x_1,x_2):x_1, x_2 \in \{0,1\}\}$, with value 12 and also provides (0,0) for $\min\{p_{(0,2)}(x_1,x_2):x_1,x_2 \in \{0,1\}\}$ with value 6.

According to processing step 110, the plurality of solutions is provided to a processing unit.

According to processing step 112, the solution is determined using the plurality of solutions provided.

Figure 6:
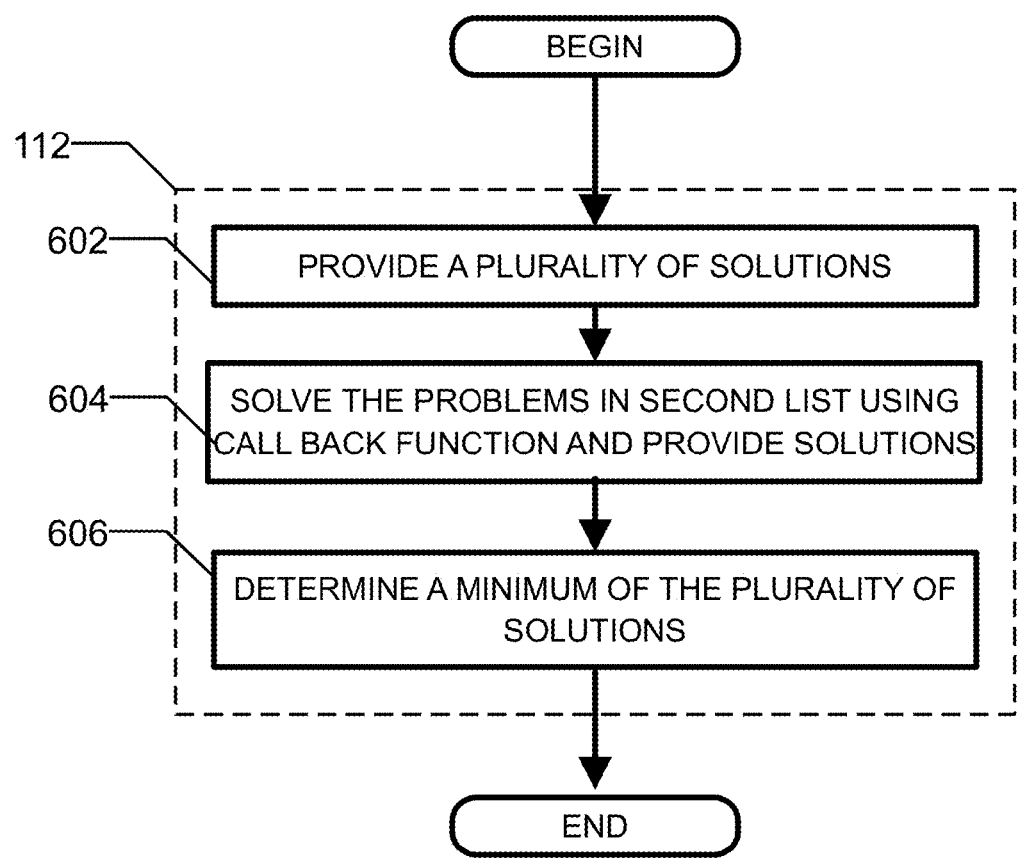
FIG. 6 is a flowchart that shows an embodiment for determining the solution using the plurality of solutions.

Now referring to FIG. 6, there is shown an embodiment for determining the solution using the plurality of solutions.

In accordance with processing step 602, a plurality of solutions is provided.

In the case of the example disclosed above, the plurality of solutions comprises the binary point (1,0) from problem $p_{(2,0)}(x_1,x_2)$ corresponding to integer point (3, 0) and also the binary point (0, 0) from problem $p_{(0,2)}(x_1,x_2)$ corresponding to integer point (0, 2).

According to processing step 604, the plurality of constrained binary optimization problems in the second list are provided to a call back function solve_constrained_problems( ) which finds the minimum value solution among all integer points of the associated fundamental cubes associated to the problems in the second list.

In the example disclosed above the call back function provides (1,1) as optimal solution for $\min\{p_{(0,0)}(x_1,x_2):x_1, x_2 \in \{0, 1\}\}$ subject to inequality constraints, with value 53 and the point (0,0) with value 808 for the problem $\min\{p_{(2,2)}(x_1,x_2):x_1,x_2 \in \{0, 1\}\}$ subject to corresponding inequality constraints.

The call back function solve_constrained_problems( ) is provided by the user as a script which may be written, in one embodiment, in a programming language selected from a group consisting of C++, Python and Matlab™.

According to processing step 606, a minimum is determined in the plurality of solutions provided from solving the problems in the first list and in the second list.

In the example disclosed above the best solution is initialized as undefined for R=0. When R=2 the point (1, 1) with value 53 is provided. When R=10, the point (0, 2) with value 6 is provided.

The minimum is determined using the digital computer.

According to processing step 114, a test is performed in order to determine if the best solution found so far is the optimal solution of the problem or not. In one embodiment, this test comprises first checking whether all fundamental cubes of the feasible region determined by $A_{ineq}x \leq b_{ineq}$ have been processed, and if not then checking whether the minimum of the continuous relaxation of the original quadratic programming problem in radius R from the reference point z is greater than a current best solution or not.

If the answer to both tests is negative and in accordance with processing step 116, the loop counter R is set to R+1 and processing step 104 is repeated.

It will be appreciated that a non-transitory computer-readable storage medium is further disclosed. The non-transitory computer-readable storage medium for storing computer-executable instructions which, when executed, cause a digital computer to perform a method for solving a convex integer quadratic programming problem using a binary optimizer, the method comprising receiving, using a processor, a convex integer quadratic programming problem; converting, using the processor, the convex integer quadratic programming problem into a plurality of constrained and unconstrained binary quadratic programming problems; providing, using the processor, the plurality of unconstrained binary quadratic programming problems to the binary optimizer; obtaining from the binary optimizer, using the processor, a plurality of solutions for the plurality of unconstrained binary quadratic programming problems to the binary optimizer and determining, using the processor, a solution using at least the plurality of solutions.

It will be appreciated that an advantage of the method disclosed herein is that it enables the translation of an integer quadratic programming problem into a plurality of binary programming problems that can be solved by a binary optimizer.

It will be further appreciated that the invention disclosed herein provides a method that greatly improves the processing of a system for solving a complex integer quadratic programming problem.

In fact, it will be appreciated that the processing of the system for solving a complex integer quadratic programming problem is greatly improved by using a binary optimizer.

Although the above description relates to a specific preferred embodiment as presently contemplated by the inventor, it will be understood that the invention in its broad aspect includes functional equivalents of the elements described herein.

The invention claimed is:

1. A method for solving a convex integer quadratic programming problem, the method comprising:
   using a processor for:
      receiving the convex integer quadratic programming problem, wherein receiving the convex integer quadratic programming problem comprises:
         obtaining a quadratic objective function representative of the convex integer quadratic programming problem,
         obtaining equality constraints,
         obtaining inequality constraints,
         modifying the quadratic objective function, and
         providing the modified quadratic objective function with only inequality constraints;
      converting the convex integer quadratic programming problem into a plurality of constrained and unconstrained binary quadratic programming problems, wherein the converting of the convex integer quadratic programming problem into a plurality of constrained and unconstrained binary quadratic programming problems using the processor comprises:
         identifying a first plurality of fundamental cubes contained in a polytope and a second plurality of fundamental cubes intersecting the boundary and exterior of the polytope, and
         determining a corresponding binary programming problem for each of the first plurality of fundamental cubes contained in the polytope and determining a corresponding constrained binary programming problem for each of the second plurality of fundamental cubes intersecting the boundary and exterior of the polytope,
         wherein the plurality of unconstrained binary quadratic programming problems comprises the plurality of binary programming problems for each of the first plurality of fundamental cubes;
      providing the plurality of unconstrained binary quadratic programming problems to a binary optimizer, the binary optimizer comprising:
         a digital computer embedding at least one of the plurality of unconstrained binary quadratic programming problems as an Ising spin model, and
         an analog computer that carries optimization of a configuration of spins in the Ising spin model;
      obtaining from the analog computer, using the digital computer, a plurality of solutions for the plurality of unconstrained binary quadratic programming problems; and
      determining, using the digital computer, a solution using at least the plurality of solutions.

2. The method as claimed in claim 1, wherein the modifying of the quadratic objective function comprises adding the equality constraints to the quadratic objective function as penalty terms.

3. The method as claimed in claim 1, wherein the determining of a corresponding constrained binary programming problem for each of the second plurality of fundamental cubes intersecting the boundary and exterior of the polytope further comprises adding a system of inequality constraints.

4. The method as claimed in claim 1, wherein determining of a corresponding binary programming problem of a given fundamental cube comprises computing a pullback of the modified quadratic objective function along the given fundamental cube.

5. A method for solving a convex integer quadratic programming problem, the method comprising:
   receiving, using a digital computer of a binary optimizer, the convex integer quadratic programming problem, and receiving the convex integer quadratic programming problem comprises:
      obtaining a quadratic objective function representative of the convex integer quadratic programming problem,
      obtaining equality constraints,
      obtaining inequality constraints,
      modifying the quadratic objective function, and
      providing the modified quadratic objective function with only inequality constraints;
   converting, using the digital computer, the convex integer quadratic programming problem into a plurality of constrained and unconstrained binary quadratic programming problems, wherein converting the convex integer quadratic programming problem into a plurality of unconstrained binary quadratic programming problems comprises:
  identifying a first plurality of fundamental cubes contained in a polytope and a second plurality of fundamental cubes intersecting the boundary and exterior of the polytope, and
  determining a corresponding unconstrained binary programming problem for each of the first plurality of fundamental cubes contained in the polytope and a constrained binary programming problem for each of the second plurality of fundamental cubes intersecting the boundary and exterior of the polytope,
  wherein the plurality of unconstrained binary quadratic programming problems comprises the plurality of binary programming problems for each of the first plurality of fundamental cubes;
providing, using the digital computer, the plurality of unconstrained binary quadratic programming problems to an analog computer of the binary optimizer, wherein at least one of the plurality of unconstrained binary quadratic programming problems is embedded in the digital computer as an Ising spin model and the analog computer carries optimization of a configuration of spins in the Ising spin model;
obtaining from the analog computer, using the digital computer, a plurality of solutions for the plurality of unconstrained binary quadratic programming problems; and
determining, using the digital computer, a solution using at least the plurality of solutions.

6. The method as claimed in claim 5, wherein the modifying of the quadratic objective function comprises adding the equality constraints to the quadratic objective function as penalty terms.

7. The method as claimed in claim 5, wherein the determining of a corresponding binary programming problem for each of the first and the second plurality of fundamental cubes intersecting the boundary and exterior of the polytope further comprises adding a system of inequality constraints.

8. The method as claimed in claim 5, wherein determining a corresponding binary programming problem of a given fundamental cube comprises computing a pullback of the modified quadratic objective function along the given fundamental cube.

9. The method as claimed in claim 5, wherein the determining using the processor of a solution using at least the plurality of solutions comprises:
  solving the plurality of constrained binary problems to provide a corresponding set of solutions; and
  determining a minimum in the corresponding set of solutions and the plurality of solutions.

10. A system for solving a convex integer quadratic programming problem, the system comprising:
  a binary optimizer comprising:
    a digital computer; and
    an analog computer,
  wherein the binary optimizer is configured for: receiving a plurality of unconstrained binary quadratic programming problems, solving the plurality of unconstrained binary quadratic programming problems and providing a plurality of corresponding solutions, wherein receiving the convex integer quadratic programming problem comprises:
    obtaining a quadratic objective function representative of the convex integer quadratic programming problem,
    obtaining equality constraints,
    obtaining inequality constraints,
    modifying the quadratic objective function, and
    providing the modified quadratic objective function with only inequality constraints; and
  wherein the digital computer is configured for receiving the convex integer quadratic programming problem, converting the convex integer quadratic programming problem into a plurality of constrained binary quadratic problems and the plurality of unconstrained binary quadratic problems, embedding at least one of the plurality of unconstrained binary quadratic programming problems as an Ising spin model, providing the plurality of unconstrained binary quadratic problems to the analog computer, obtaining from the analog computer the plurality of solutions, determining a solution using the plurality of solutions and providing the determined solution;
  wherein the analog computer carries optimization of a configuration of spins in the Ising spin model;
  wherein the converting of the convex integer quadratic programming problem into the plurality of unconstrained binary quadratic programming problems comprises:
    identifying a first plurality of fundamental cubes contained in a polytope and a second plurality of fundamental cubes intersecting the boundary and exterior of the polytope, and
    determining a corresponding unconstrained binary programming problem for each of the first plurality of fundamental cubes contained in the polytope and a constrained binary programming problem for each of the second plurality of fundamental cubes intersecting the boundary and exterior of the polytope,
    wherein the plurality of unconstrained binary quadratic programming problems comprises the plurality of binary programming problems for each of the first plurality of fundamental cubes.

11. The system as claimed in claim 10, wherein the convex integer quadratic programming problem is provided to the digital computer by one of a user, an independent software package and an intelligent agent.

12. The system as claimed in claim 10, wherein the determined solution is provided to one of a user interacting with the digital computer and another computer operatively connected to the digital computer.

13. A non-transitory computer-readable storage medium storing computer-executable instructions which, when executed, perform a method for solving a convex integer quadratic programming problem, the method comprising:
  receiving, using a digital computer of a binary optimizer, the convex integer quadratic programming problem, wherein receiving the convex integer quadratic programming problem comprises:
    obtaining a quadratic objective function representative of the convex integer quadratic programming problem,
    obtaining equality constraints,
    obtaining inequality constraints,
    modifying the quadratic objective function, and
    providing the modified quadratic objective function with only inequality constraints;
  converting, using the digital computer, the convex integer quadratic programming problem into a plurality of constrained and unconstrained binary quadratic programming problems, wherein the converting of the convex integer quadratic programming problem into the plurality of unconstrained binary quadratic programming problems comprises:
identifying a first plurality of fundamental cubes contained in a polytope and a second plurality of fundamental cubes intersecting the boundary and exterior of the polytope, and
determining a corresponding unconstrained binary programming problem for each of the first plurality of fundamental cubes contained in the polytope and a constrained binary programming problem for each of the second plurality of fundamental cubes intersecting the boundary and exterior of the polytope,
wherein the plurality of unconstrained binary quadratic programming problems comprises the plurality of binary programming problems for each of the first plurality of fundamental cubes;
embedding, using the digital computer, at least one of the plurality of unconstrained binary quadratic programming problems as an Ising spin model;
providing, using the digital computer, the plurality of unconstrained binary quadratic programming problems to an analog computer of the binary optimizer, wherein the analog computer carries optimization of a configuration of spins in the Ising spin model;
obtaining from the analog computer, using the digital computer, a plurality of solutions for the plurality of unconstrained binary quadratic programming problems; and
determining, using the digital computer, a solution using at least the plurality of solutions.

14. A digital computer for solving a convex integer quadratic programming problem, the digital computer comprising:
a display device;
a processor;
a communication port;
a memory unit comprising an application; and
one or more programs, wherein the one or more programs are stored in the memory unit and configured to be executed by the processor, the one or more programs including:
instructions for receiving the convex integer quadratic programming problem, wherein receiving the convex integer quadratic programming problem comprises:
obtaining a quadratic objective function representative of the convex integer quadratic programming problem,
obtaining equality constraints,
obtaining inequality constraints,
modifying the quadratic objective function, and
providing the modified quadratic objective function with only inequality constraints;
instructions for converting the convex integer quadratic programming problem into a plurality of constrained and unconstrained binary quadratic programming problems, wherein the converting of the convex integer quadratic programming problem into the plurality of unconstrained binary quadratic programming problems comprises
identifying a first plurality of fundamental cubes contained in a polytope and a second plurality of fundamental cubes intersecting the boundary and exterior of the polytope, and
determining a corresponding unconstrained binary programming problem for each of the first plurality of fundamental cubes contained in the polytope and a constrained binary programming problem for each of the second plurality of fundamental cubes intersecting the boundary and exterior of the polytope,
wherein the plurality of unconstrained binary quadratic programming problems comprises the plurality of binary programming problems for each of the first plurality of fundamental cubes;
instructions for providing the plurality of unconstrained binary quadratic programming problems to a binary optimizer, wherein:
at least one of the plurality of unconstrained binary quadratic programming problems is embedded in the digital computer as an Ising spin model, and
the binary optimizer comprises an analog computer that carries optimization of a configuration of spins in the Ising spin model;
instructions for obtaining from the binary optimizer a plurality of solutions for the plurality of unconstrained binary quadratic programming problems;
instructions for determining a solution using at least the plurality of solutions; and
instructions for providing the solution.

* * * * *